United States Patent
Naclerio (10) Patent No.: US 6,820,065 B1
(45) Date of Patent: Nov. 16, 2004

(54) SYSTEM AND METHOD FOR MANAGEMENT OF POSTAGE METER LICENSES

(75) Inventor: Edward J. Naclerio, Madison, CT (US)

(73) Assignee: Ascom Hasler Mailing Systems Inc., Shelton, CT (US)

( * ) Notice: Subject to any disclaimer, the term of this patent is extended or adjusted under 35 U.S.C. 154(b) by 0 days.

(21) Appl. No.: 09/646,492
(22) PCT Filed: Mar. 18, 1999
(86) PCT No.: PCT/US99/05892

§ 371 (c)(1),
(2), (4) Date: Nov. 9, 2000

(87) PCT Pub. No.: WO99/48053

PCT Pub. Date: Sep. 23, 1999

Related U.S. Application Data (60) Provisional application No. 60/078,488, filed on Mar. 18, 1998.

(51) Int. Cl.$^7$ ............................................. G07D 17/00
(52) U.S. Cl. ......................... 705/401; 705/30; 705/404
(58) Field of Search .......................... 705/30, 401, 403, 705/404, 410

(56) References Cited

U.S. PATENT DOCUMENTS

| | | | |
|---|---|---|---|
| 4,802,218 A | | 1/1989 | Wright et al. .................. 380/23 |
| 4,812,994 A | | 3/1989 | Taylor et al. ........... 364/464.02 |
| 4,914,606 A | | 4/1990 | Vermesse .................... 364/518 |
| 4,958,291 A | * | 9/1990 | Mamone et al. ............. 705/404 |
| 4,980,542 A | | 12/1990 | Jackson et al. ............. 235/375 |
| 5,124,926 A | | 6/1992 | Barns-Slavin et al. . 364/464.03 |
| 5,572,429 A | * | 11/1996 | Hunter et al. ................ 705/404 |
| 5,606,507 A | * | 2/1997 | Kara ........................... 705/408 |
| 5,668,973 A | | 9/1997 | Stutz et al. .................. 711/152 |
| 5,712,542 A | | 1/1998 | Stutz et al. .................... 318/66 |
| 6,526,391 B1 | * | 2/2003 | Cordery et al. ............... 705/60 |
| 2001/0020234 A1 | * | 9/2001 | Shah et al. .................... 705/62 |

FOREIGN PATENT DOCUMENTS

| | | |
|---|---|---|
| WO | WO 97/46389 | 12/1997 |
| WO | WO 98/08325 | 2/1998 |
| WO | WO 98/13790 | 4/1998 |
| WO | WO 98/57306 | * 12/1998 |
| WO | WO 99/48503 | * 9/1999 |

OTHER PUBLICATIONS

"Clicking may stamp out licking; US Postal Service to start testing electronic stamps.": Florida Times Union (Jacksonville, FL), Apr. 1, 1998, p. B4.*

* cited by examiner

Primary Examiner—Edward R. Cosimano
(74) Attorney, Agent, or Firm—Perman & Green, LLP (57) ABSTRACT

A postal security device has a secure housing within which are two or more accounting register sets. The accounting register sets are associated with distinct meter licenses. The postal security device can also store a single accounting register set, but is able to transfer the cryptographically signed register set to a nonsecure store such as the hard drive of a personal computer, the register set having been cryptographically signed. The register set may be retrieved from the nonsecure store and cryptographically authenticated, and restored to its location within the secure housing of postal security device. The postal security may provide service under more than one distinct meter license. The single meter license can also be associated with more than one postal security device, each with its own secure housing. Each register set is configured to permit being reset by means of a cryptographically secure exchange of data over a communications channel to external equipment such as a manufacturer's server or a server operated by the post office.

7 Claims, 5 Drawing Sheets

SYSTEM AND METHOD FOR MANAGEMENT OF POSTAGE METER LICENSES

The application claims priority from U.S. application no. 60/078,488, filed Mar. 18, 1998, which application is incorporated herein by reference to the extent permitted the designated and elected States hereto.

The invention relates generally to postage meters (franking machines), and relates particularly to systems in which postage meter licenses are managed in a way that is non-identical to the number of associated postal security devices.

BACKGROUND

It has been well known for many decades to use postage meter which has within a secure housing an accounting means and a printing means. The accounting means includes an ascending register indicative of postage that has been printed, and typically a piece counter indicative of the number of mail pieces that have been printed. In many countries including the United States, the accounting means also includes a descending register indicative of the amount of postage value available to be printed. The printing means is used to print postage indicia on mail pieces, typically by a relief printing die with characteristic fluorescent ink. Such postage meters have worked exceeding well for decades and have proven to be reliable. While it is technically possible to print postal indicia for which no money has been paid to the post office, such fraud is relatively infrequent because it would be readily detectable through physical inspection of the meter for tampering.

The postage meter saves the postal authority from much of the work of printing, stocking and selling postage stamps. When postal rates change, the postage meter user can simply print the new postal amount, while the stamp user must queue up at the post office to purchase stamps in the new denomination.

In recent years it has been proposed to print postal indicia by means of conventional nonsecure printers such as laser printers, ink-jet printers, and thermal transfer printers. Such printers are termed "nonsecure" because the printer itself is not in a secure housing and because the communications channel linking the printer to other apparatus is nonsecure.

Under such a proposal, the question naturally arises what would prevent a user from printing the same postal indicium repeatedly, thereby printing postal indicia for which no money has been paid to the post office. The proposed anti-fraud measure is to store information within the indicia which would permit detecting fraud. The indicium would include not only human-readable text such as a date and a postage amount, but would also include machine-readable information, for example by means of a two-dimensional bar code. The machine-readable information would be cryptographically signed, and would include within it some information intended to make fraud more difficult. The information would typically include an identification of the postage meter license (granted by the meter manufacturer or by the postal authorities, depending on the country), an indication of the number of mail pieces franked, the postage amount, a postal security device identifier about which more will be said later, the date and time, and a zip code or post code of the mail piece addressee.

There are, of course, many potential drawbacks to such an approach for printing of postal indicia. A user who intends to defraud the postal service might use a bar-code reader to read the contents of the indicium. (This capability illustrates the pointlessness of trying to give physical security to the printing means or of the communications channel by which the printing means is controlled.) The contents of the bar code could be used to print identical or nearly identical indicia, perhaps at a geographic distance. It would then fall to the postal service to perform an analysis on all or nearly all of the indicia scanned on a particular day, to try to identify duplicates.

Yet another drawback is that it is commonplace for a mail piece to get smudged on the way to the post office or within the post office, prior to the authentication scanning by the post office. If the post office is unable to read the bar code, the post office has to decide whether to return the mail piece to the sender, or risk delivering a mail piece bearing a counterfeit indicium.

The typical apparatus for printing such "encrypted indicia" postage includes what is called a postal security device or PSD. The PSD has a secure housing, and within the secure housing cryptographic authentication and signing for communication with an external device such as the computer of the meter manufacture or of the post office. The engine also permits creation of postal indicia which contain specified information and which are cryptographically signed. The PSD may well be physically small as compared to traditional postage meters. The PSD may be the size of a PCMCIA card or the size of a smart card.

Within the PSD the memory must be protected against unadvertent damage due to malfunction of tile processor of the PSD, for example as set forth in U.S. Pat. No. 5,668,973, Protection system for critical memory information owned by the same assignee as the assignee of the present application. The PSD must handle power failure in a graceful fashion, for example as set forth in U.S. Pat. No. 5,712,542, Postage meter with improved handling of power failure, also owned by the same assignee as the assignee of the present application.

To reduce smudging, the printer may preferably be that described in PCT publication no. 97-46389, Printing apparatus, also owned by the same assignee as the assignee of the present application. While it has been proposed that the PSD contain a real-time clock which is keeping time continuously, desirably this requirement may be avoided as described in PCT publication no. 98-08325, Printing postage with cryptographic clocking security, also owned by the same assignee as the assignee of the present application. PSDs can form part of a network with multiple printers as described in PCT publication no. 98-13790, Proof of postage digital franking, also owned by the same assignee as the assignee of the present application.

The PSD in proposed systems contains the ascending and (optional depending oil country) descending registers, the piece counter, and a "meter license number". The meeter license number represents a legal license granted by the postal authority which permits operation of the PSD and the associated printing of postage indicia. It is assumed that the PSD also has a unique identifying number stored within the PSD, but this number is expected to be non-identical to the meter license number. For example, if a PSD were to require service, the PSD manufacturer may take one PSD out of service for a particular customer and place another PSD into service for that particular customer, and yet the meter license number (which pertains to the customer) may remain the same.

It would be advantageous to have a system with great flexibility to accommodate a number of users, or to accommodate the use of several PSDs per user, yet the proposed PSD arrangements are inflexible.

SUMMARY OF THE INVENTION

A system is provided in which a single postal security device has a secure housing, and within the secure housing are two or more accounting register sets. Importantly, the two or more accounting register sets are associated with distinct meter licenses. Alternatively, the single postal security device can store a single accounting register set, but is able to transfer the register set to a nonsecure store such as the hard drive of a personal computer, the register set having been cryptographically signed. Later the register set may be retrieved from the nonsecure store and cryptographically authenticated, and restored to its location within the secure housing. In this way, the postal security device may provide service under more than one distinct meter license. In a related embodiment, a single meter license is associated with more than one postal security device, each with its own secure housing. Each register set is configured to permit being reset (refilled with postage) by means of a cryptographically secure exchange of data over a communications channel to external equipment such as a manufacturer's server or a server operated by the post office.

DESCRIPTION OF THE DRAWING

The invention will be described in detail with respect to a drawing in several figures, of which.

DETAILED DESCRIPTION

Figure 1:
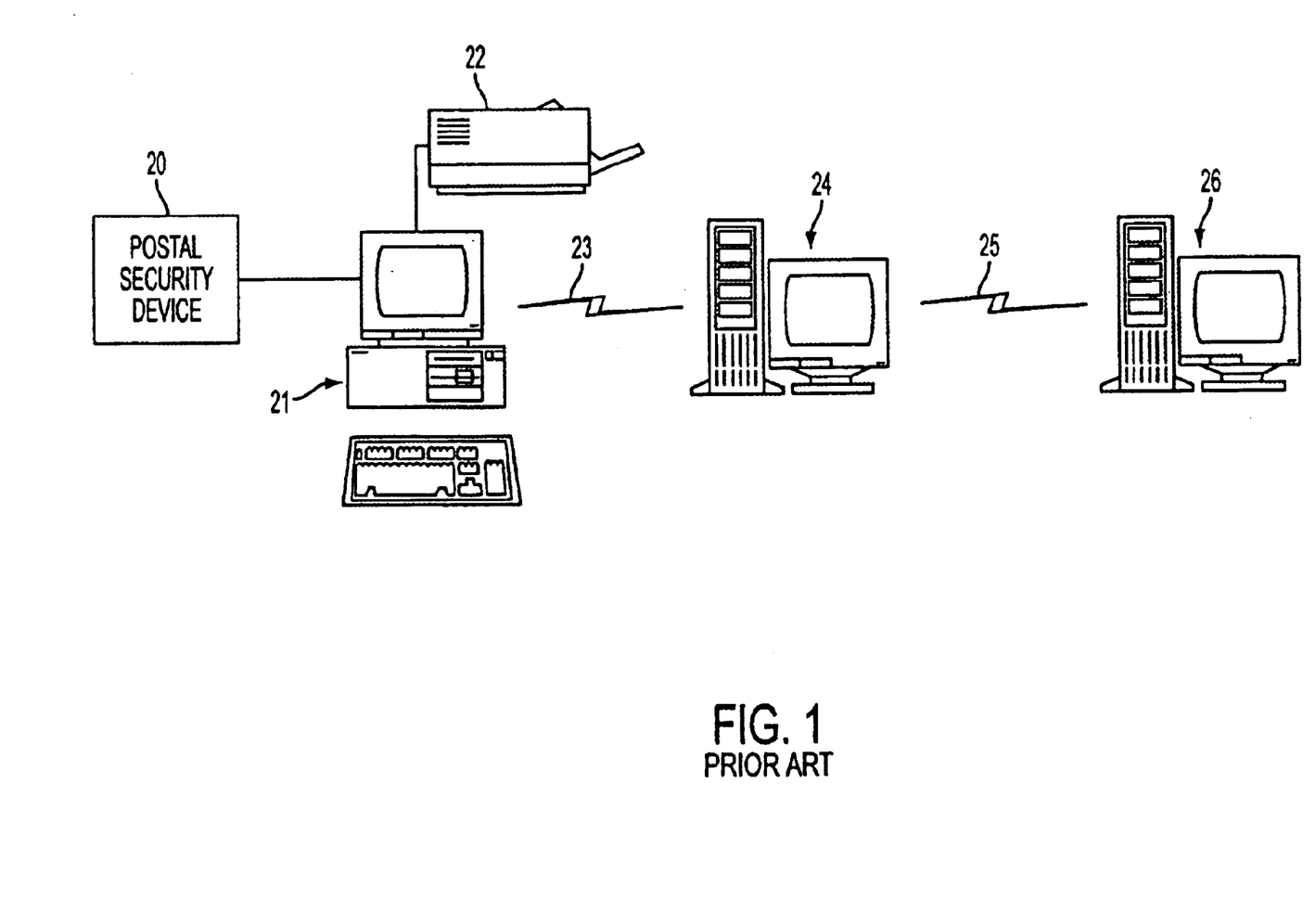
FIG. 1 shows in functional block diagram form a prior art PSD system.

Turning now to FIG. 1, there is shown in functional block diagram form a prior art PSD system. A postal security device (PSD) 20 is connected with a user system 21, typically a person computer or workstation. Connected directly or through a local area network is a printer 22 on which postal indicia are printed. The user system 21 is communicatively coupled with a manufacturer's system 24, which in turn is communicatively coupled with the postal authority 26. The communicative links 23 and 25 are preferably TCP/IP links via the Internet, but may optionally be other links such as dialup modem access lines or dedicated data lines.

Figure 2:
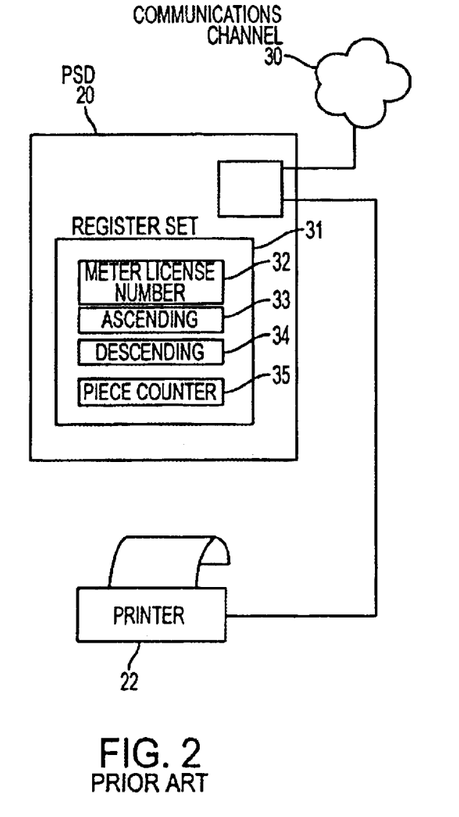
FIG. 2 shows in functional block diagram form a portion of a prior art PSD system.

The PSD 20 contains postage value, embodied in the contents of the descending register (item 34 in FIG. 2). In response to a request from the user via the computer 21, the PSD 20 generates an "encrypted indicium", that is, a print image containing cryptographically signed information, to be printed by means of printer 22 onto an envelope or post card or postage label. The image includes human-readable information as well as computer-readable information in bar code form. If the user wishes to "refill" of "reset" the postage meter, this is done by means of a cryptographically secure exchange between the PSD 20 and the manufacturer's system 24. Depending on the requirements of the postal authority, the resetting may also include an exchange with the postal authority's system 26. When the postal indicium is generated, the descending register is decremented accordingly, the ascending register is decremented accordingly, and the piece count is incremented. The indicium typically includes, in cryptographically signed or encrypted form, the meter license number, a unique number identifying the PSD, the date and time, the contents of the accounting registers, and other information to make the indicium unique such as the post code or Zip code of the mail piece addressee. It will be appreciated that in some countries there is no descending register and the payment by the user is based instead on the changing value of the ascending register. The teachings of the invention may be applied equally well to systems in countries that use a descending register and in countries that do not use a descending register.

FIG. 2 shows in functional block diagram form a portion of a prior art PSD system. The PSD 20 has a communications channel 30 which permits data exchanges with the user's computer (item 21 in FIG. 1) and with the manufacturer's system 24. The PSD 20 contains a register set 31, which include a meter license number 32, an ascending register 33, a descending register 34, and a piece counter 35. The PSD typically contains a cryptographic engine, a clock/calendar, a microprocessor, RAM, nonvolatile RAM, ROM, and a battery, all omitted for clarity in FIG. 2. The PSD has a secure housing to make undetected tampering nearly impossible. The PSD 20 communicates with a printer 22 for printing postage indicia.

Figure 3:
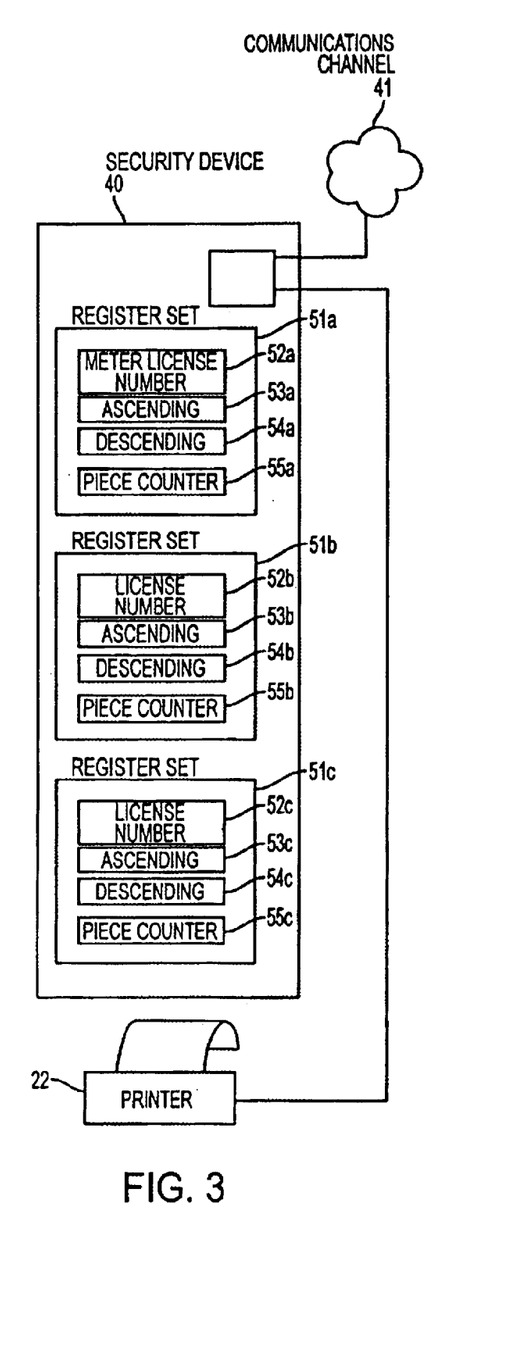
FIG. 3 shows in functional block diagram form a PSD system according to an embodiment of the invention.

FIG. 3 shows in functional block diagram form a PSD system according to an embodiment of the invention. Contained within the PSD 40 are two or more register sets 51a, 51b, 51c. Each contains a meter license number 52a, 52b, 52c, an ascending register 53a, 53b, 53c, a descending register 54a, 54b, 54c, and a piece counter 55a, 55b, 55c. In response to user selections, the PSD 40 can print postage with respect to any one of the register sets, and can reset (refill) any one of the register sets.

Described differently, what is shown is a franking system comprising a printer 22, a postal security device 40 communicatively coupled with the printer 22, and a communications channel 41 coupled with the postal security device 40 to apparatus external to the printer 22 and external to the postal security device 40, the postal security device 40 comprising a secure housing, the postal security device 40 containing within the secure housing a first register set 51a comprising information indicative of a first license number 52a, a first ascending register 53a, and a first piece counter 55a, the postal security device 40 further containing within the secure housing a second register set 51b comprising information indicative of a second license number 52b, a second ascending register 53b, and a second piece counter 55b, each of the ascending registers 53a,53b indicative of postage printed in connection with the respective license number 52a, 52b, each of the piece counters 55a, 55b indicative of a number of mail pieces franked in connection with the respective license number 52a, 52b; the postal security device 40 further comprising a franking means responsive to a user request for the printing of a postage indicium in a particular value in connection with a particular license number 52a, 52b by incrementing the ascending register 53a, 53b in the particular value, by incrementing the piece counter 55a, 55b, and by creating a cryptographically authenticated indicium based in part on the license number 52a, 52b and the particular value for printing on the printer 22; each register set 51a, 51b disposed to be reset by means of a cryptographically secure exchange over the communications channel 41, the cryptographically secure exchange including transmission of information indicative of the license number 52a, 52b associated with the each register set 51a, 51b.

A company may have several individuals who generate mail, in particular with PC-based word processing programs. These individuals may be located in different geographic locations. Often it is desired to enter mail at a particular post office as it may speed delivery of that mail to the recipient or recipients. Under the requirements and constraints of the traditional postage metering environment, a company might have to license multiple postage meters for multiple users and for multiple mail entry points. With the system according to the invention, however, a single may be able to serve multiple users.

It is assumed that each meter license number has associated with it a particular town in which its mail is to be deposited. (This is important to give revenue credit to each town's post office in keeping with the mail deposited therein.) Thus, implied by a particular license is the digitally printed equivalent of the "town die" in a tradition postage meter which indicates the town in which mail is to be deposited. The PSD according to the invention, accommodating more than one license, can enable the user to generate franked mail for deposit in more than one town.

The postal service may require that the PSD generates a new public/private key pair for signing indicia for each new or additional meter license from the postal authority. In such a case, the private key must of course be securely stored within the PSD. The public key is signed by a certificate authority and is stored in the host system along with the signed meter licenses.

Figure 4:
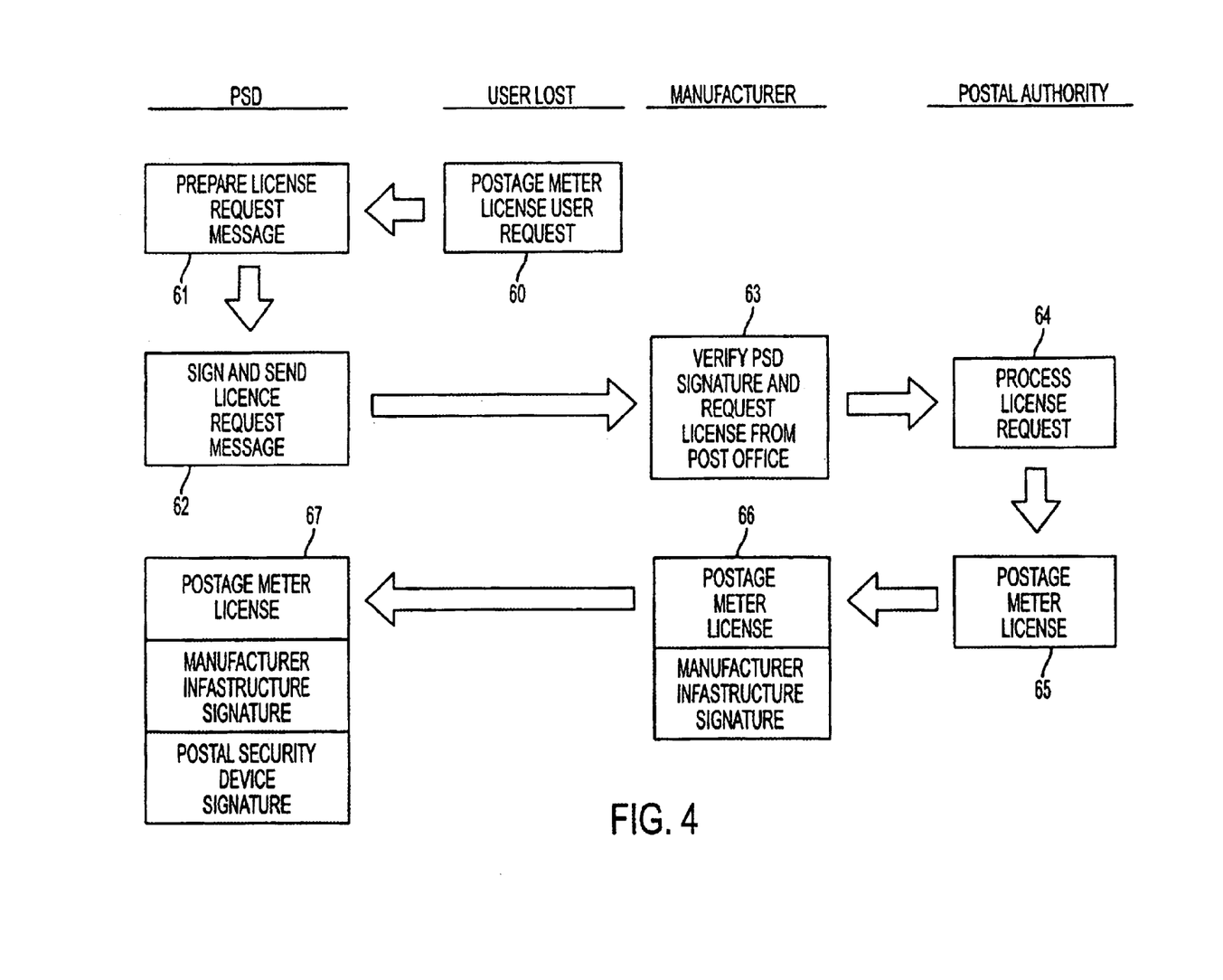
FIG. 4 shows in a data flow diagram the steps associated with obtaining an additional meter license with a PSD in accordance with an embodiment of the invention.

FIG. 4 shows in a data flow diagram the steps associated with obtaining an additional meter license with a PSD in accordance with an embodiment of the invention. The user requests the license on the user host system (21 in FIG. 1) in step 60. The user host system 21 forwards the request to the postal security device 40 (in FIG. 4) which prepares a license request message in step 61. The PSD 40 cryptographically signs the message in step 62 and sends the request back to the user host system 21 which forwards the request to the manufacturer system 24 (FIG. 1). The manufacturer system 24 verifies the origin of the request by verifying the signature (block 63) from the PSD 40. The request is then forwarded to the postal authority system 26 (FIG. 1) in step 64. It should be noted that the communications links 23, 25 may be secured, but preferably no security assumption is made about the links 23, 25 and instead cryptographic measures (such as signatures) are employed. After evaluation of the request, the postal authority system 26 issues a meter license number and grants the requested license in step 65, typically adding its own digital signature to the license. The manufacturer's system 24 (FIG. 1) verifies the validity of the license and adds its own digital signature (step 66) and passes the license along to the postage meter (i.e. the PSD 40 in FIG. 3). The PSD 40 establishes accounting registers to correspond to the license, and is able to generate postal indicia in connection with the license.

Described in a different way, a franking system includes a PSD which contains within its secure housing a means responsive to a cryptographically authenticated authorization received on the communications channel for creating within the secure housing a second register set comprising information indicative of a second license number, a second ascending register, and a second piece counter, each of the ascending registers indicative of postage printed in connection with the respective license number, each of the piece counters indicative of a number of mail pieces franked in connection with the respective license number. The PSD further comprises a franking means responsive to a user request for the printing of a postage indicium in a particular value in connection with a particular license number by incrementing the ascending register in the particular value, by incrementing the piece counter, and by creating a cryptographically authenticated indicium based in part on the license number and the particular value for printing on the printer. Each register set is able to be reset by means of a cryptographically secure exchange over the communications channel, the cryptographically secure exchange including transmission of information indicative of the license number associated with the register set.

The method of adding a register set responds to a user request for a second register set. A license request message is prepared and cryptographically signed (blocks 60, 61, 62), the signed license request message is communicated on the communications channel, a response is received on the communications channel and is cryptographically authenticated (block 67). A second register set comprising information indicative of a second license number, a second ascending register, and a second piece counter is created within the PSD 40.

It may happen that the PSD 44 (FIG. 5) lacks sufficient free memory to accommodate the desired number of register sets. For that reason, or for some other reason, the invention contemplates a different approach. A particular register set 51a is cryptographically signed and/or encrypted, and is stored as register set 72 on external nonsecure storage 71, such as the hard disk of the user computer 21 (FIG. 1), or other mass storage. If at a later time the user wishes to use that license, the user host system 21 can transmit the signed register set 51a from the storage 71 back to the PSD 44. The PSD 44 typically also confirms the authenticity of the signatures previously supplied by the manufacturer and the postal authority before accepting the register set 51a for the printing of postage.

Figure 5:
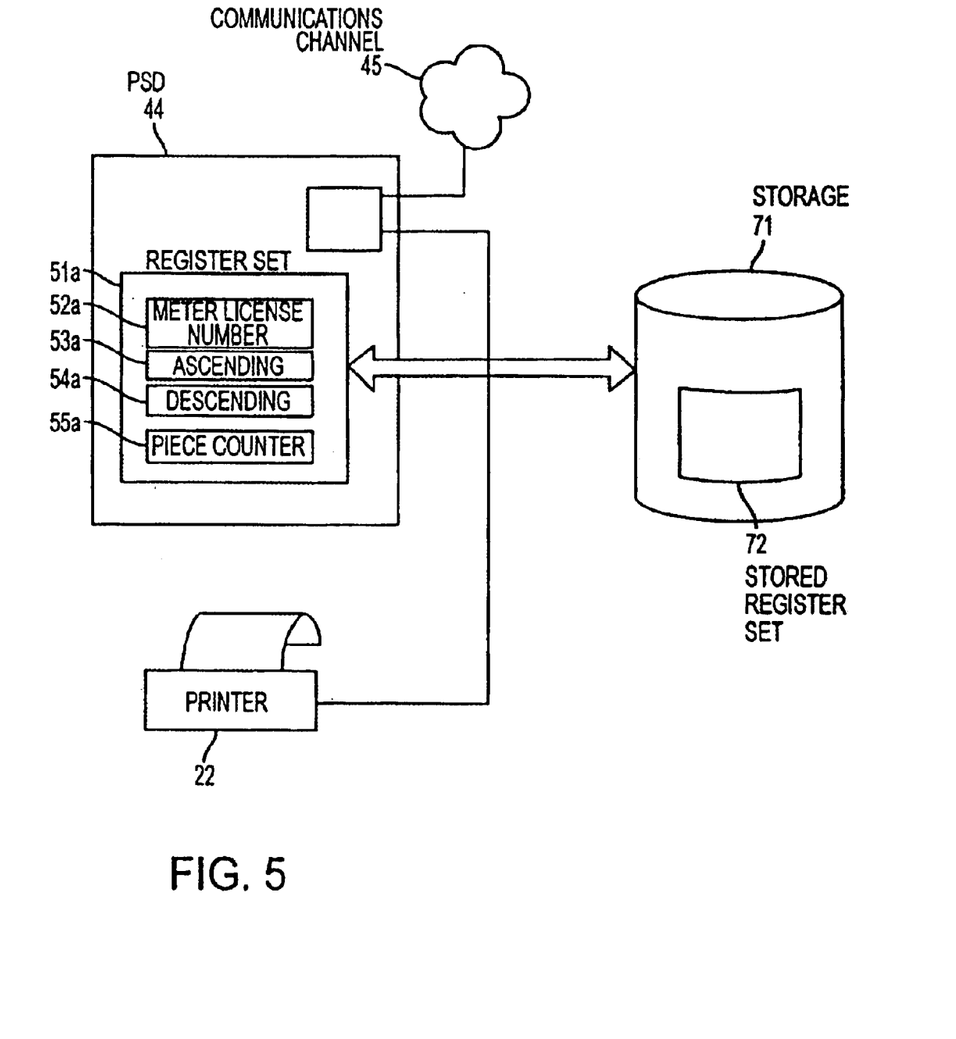
FIG. 5 shows in functional block diagram form a PSD according to another embodiment of the invention.

Stated differently, there is contained within the secure housing a means responsive to a first user request for cryptographically signing the register set 51a and copying the cryptographically signed register set 51a via the communications channel 45 to external apparatus 71. Later the stored register set 72 is retrieved from the external apparatus 71 and is cryptographically authenticated. The register set 51a thus retrieved is available for printing of postage on the printer 22, and for resetting via the communications channel 45.

Another embodiment of the invention directs itself to the problem of a single business entity which may need to be able to print postage at multiple locations despite having no need for more than one meter license. In such a system, there is more than one PSD 20, 40, 44 each with its own PSD unique identifier. But, according to the invention, the same license number may be stored into the register set of each of the PSDs. This does not pose a risk of fraud, because according to the invention the PSD unique identifier is communicated in the postal indicia along with the license number. It is assumed, as mentioned earlier, that the post office scans and authenticates every indicium anyway. Thus it is merely a data processing task to check the indicia printed to see that they add up properly to match the funds paid in connection with the license, or to see that they correspond as expected with the particular PSDs involved. If experience shows the scanning and authenticating of every postal indicium to be an unworkable task, then this is a reason to reconsider the use of encrypted indicia but does not contraindicate the use of the method according to the invention.

Figure 6:
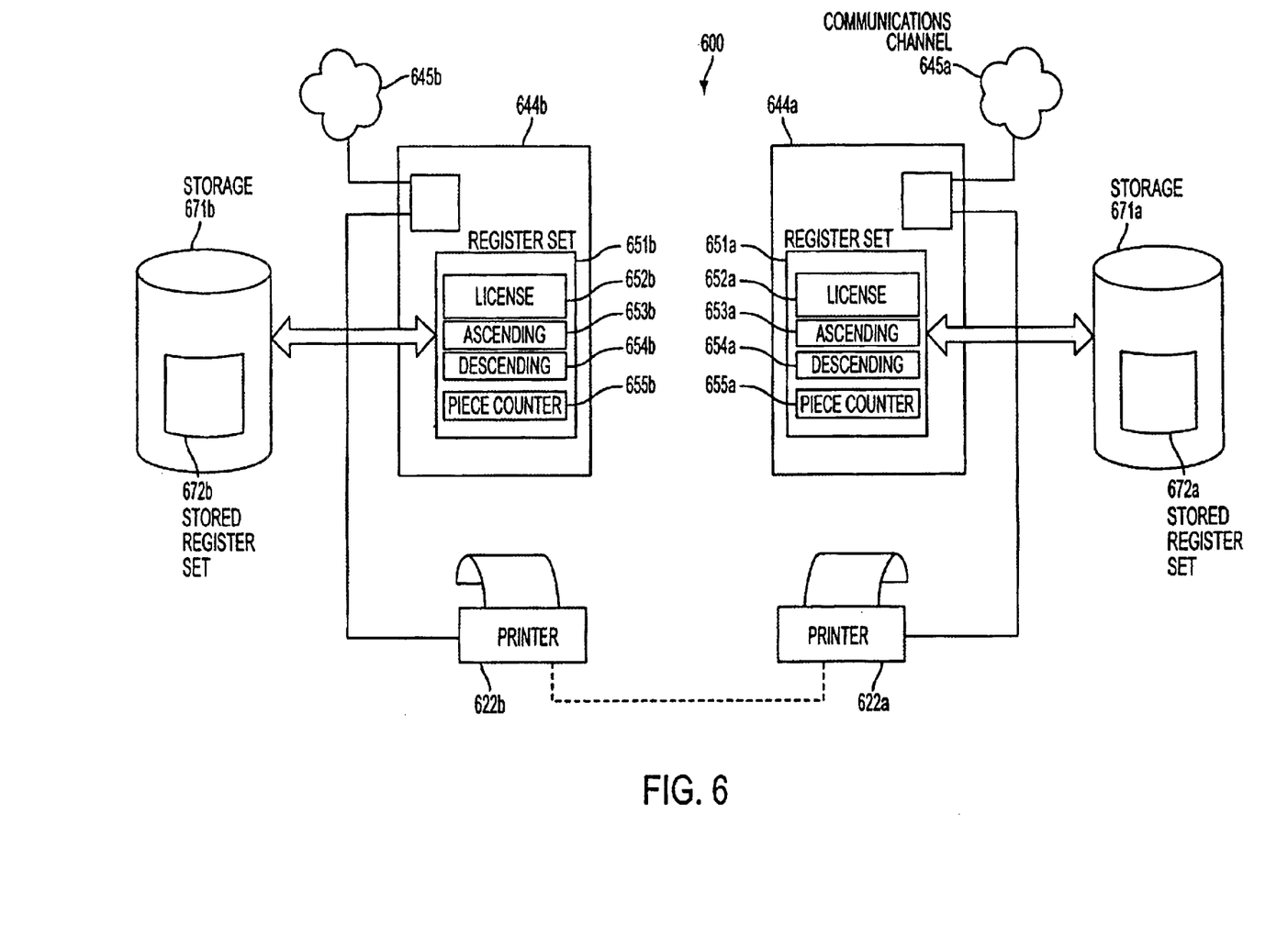
FIG. 6 shows in functional block diagram form a PSD according to another embodiment of the present invention including multiple printers.

In one embodiment, referring to FIG. 6, a franking system 600 incorporating features of the present invention can include a first printer 622a and a second printer 622b. A first postal security device 644a has a first identifier and is communicatively coupled with the first printer 622a. A first communications channel 645a couples the first postal security device 644a to apparatus external to the first printer 622a and external to the first postal security device 644a. The first postal security device 644a include a first register set 651a comprising security device 644a includes a first register set 651a comprising information indicative of a first license number 652a, a first ascending register 653a, and a first piece counter 655a. The system further comprises a second postal security device 644b having a second identifier. The second postal security device 644b communicatively coupled with the second printer 622b, and a second commucations channel 645b coupled with the second postal security device 644b to apparatus external to the second printer 622b and external to the second postal security device 644b. The second postal security device 644b comprises a second secure housing and within the second secure housing is a second register set 651b comprising information indicative of the first license number 652b, a second ascending register 653b, and a second piece counter 655b. Each of the ascending registers are indicative of postal printed in connection with the respective postal security device 644a, 644b, each of the piece counters indicative of a number of mail pieces franked in connection with the respective postal security device. Each postal security device 644a, 644b further comprises a franking means responsive to a user request for the printing of a postage indicium in a particular value by incrementing the piece counter, and by creating a cryptographically authenticated indicium based in part on the respective postal security device identifier and the particular value for printing on the printer. Register set 651a, and register set 651b are disposed to be reset by means of a cryptographically secure exchange over communications channel 645a, and communication channel 645b. The cryptographically secure exchange includes the transmission of information indicative of a license number 652a, or license number 652b associated with the register set 651a, or register set 651b. The first printer 622a, and second printer 622b could be parts of a single printing unit or system.

It may happen that the first postal security device 644a or second postal security device 644b lacks sufficient free memory to accomodate the desired nember of register sets. In one embodiment, one or both of register set 651a or 651b can cryptographically signed and/or encrypted, and is stored as register set 672a of register set 672b, respectively on external nonsecure storage 671a or external nonsecure storage 671b, such as the hard disk of the user computer 21 (FIG. 1), or other mass storage. If at a later time the user wishes to use that license, the signed register set 651a signed register set 651b from the respective storage 671a or storage 671b can be transmitted back to the respective PSD 644a or 644b.

Those skilled in the art will have no difficulty devising obvious enhancements and variations on the invention, all of which are to be encompassed by the claims which follow.

What is claimed is:

1. A franking system comprising a printer, a postal security device communicatively coupled with the printer, and a communications channel coupled with the postal security device to apparatus external to the printer and external to the postal security device, the postal security device comprising a secure housing, the postal security device containing within the secure housing a first register set comprising information indicative of a first license number, a first ascending register, and a first piece counter, the postal security device further containing within the secure housing a second register set comprising information indicative of a second license number, a second ascending register, and a second piece counter, each of the ascending registers indicative of postage printed in connection with the respective license number, each of the piece counters indicative of a number of mail pieces franked in connection with the respective license number; the postal security device further comprising a franking means responsive to a user request for the printing of a postage indicium in a particular value in connection with a particular license number by incrementing the ascending register in the particular value, by incrementing the piece counter, and by creating a cryptographically authenticated indicium based in part on the license number and the particular value for printing on the printer; each register set disposed to be reset by means of a cryptographically secure exchange over the communications channel, the cryptographically secure exchange including transmission of information indicative of the license number associated with the each register set.

2. A franking system comprising a printer, a postal security device communicatively coupled with the printer, and a communications channel coupled with the postal security device to apparatus external to the printer and external to the postal security device, the postal security device comprising a secure housing, the postal security device containing within the secure housing a first register set comprising information indicative of a first license number, a first ascending register, and a first piece counter, the postal security device further containing within the secure housing a means responsive to a cryptographically authenticated authorization received on the communications channel for creating within the secure housing a second register set comprising information indicative of a second license number, a second ascending register, and a second piece counter, each of the ascending registers indicative of postage printed in connection with the respective license number, each of the piece counters indicative of a number of mail pieces franked in connection with the respective license number; the postal security device further comprising a franking means responsive to a user request for the printing of a postage indicium in a particular value in connection with a particular license number by incrementing the ascending register in the particular value, by incrementing the piece counter, and by creating a cryptographically authenticated indicium based in part on the license number and the particular value for printing on the printer; each register set disposed to be reset by means of a cryptographically secure exchange over the communications channel, the cryptographically secure exchange including transmission of information indicative of the license number associated with the each register set.

3. A method for use with a franking system comprising a printer, a postal security device communicatively coupled with the printer, and a communications channel coupled with the postal security device to apparatus external to the printer and external to the postal security device, the postal security device comprising a secure housing, the postal, security device containing within the secure housing a first register set comprising information indicative of a first license number, a first ascending register, and a first piece counter, the ascending register indicative of postage printed in connection with the respective license number, the piece counter indicative of a number of mail pieces franked in connection with the respective license number; the postal security device further comprising a franking means responsive to a user request for the printing of a postage indicium in a particular value in connection with a particular license number by incrementing the ascending register in the particular value, by incrementing the piece counter, and by creating a cryptographically authenticated indicium based in part on the license number and the particular value for printing on the printer, the method comprising the steps of:

in response to a user request for a second register set, preparing a license request message, cryptographically signing the license request message, communicating the signed license request message on the communications channel, receiving a response on the communications channel, cryptographically authenticating the response, and creating within the secure housing a second register set comprising information indicative of a second license number, a second ascending register, and a second piece counter.

4. A franking system comprising a printer, a postal security device communicatively coupled with the printer, and a communications channel coupled with the postal security device to apparatus external to the printer and external to the postal security device, the postal security device comprising a secure housing, the postal security device containing within the secure housing a storage area capable of storing a register set comprising information indicative of a license number, an ascending register, and a piece counter, the postal security device further containing within the secure housing a means responsive to a first user request for cryptographically signing the register set and copying the cryptographically signed register set via the communications channel to external apparatus; the postal security device further containing within the secure housing a means responsive to a second user request for retrieving from external apparatus the register set and for cryptographically authenticating the register set, and for storing the register sent within the storage area; the ascending register indicative of postage printed in connection with the respective license number, the piece counter indicative of a number of mail pieces franked in connection with the respective license number; the postal security device further comprising a franking means responsive to a user request for the printing of a postage indicium in a particular value in connection with a particular license number by incrementing the ascending register in the particular value, by incrementing the piece counter, and by creating a cryptographically authenticated indicium based in part on the license number and the particular value for printing on the printer; the register set disposed to be reset by means of a cryptographically secure exchange over the communications channel, the cryptographically secure exchange including transmission of information indicative of the license number associated with the register set.

5. A method for use with a franking system, the system comprising a printer, a postal security device communicatively coupled with the printer, and a communications channel coupled with the postal security device to apparatus external to the printer and external to the postal security device, the postal security device comprising a secure housing, the postal security device containing within the secure housing a storage area capable of storing a register set comprising information indicative of a license number, an ascending register, and a piece counter, the postal security device further containing within the secure housing a means responsive to a user request for cryptographically signing the register set and copying the cryptographically signed register set via the communications channel to external apparatus; the postal security device further containing within the secure housing a means responsive for retrieving from external apparatus the register set and for cryptographically authenticating the register set, and for storing the register sent within the storage area; the ascending register indicative of postage printed in connection with the respective license number, the piece counter indicative of a number of mail pieces franked in connection with the respective license number; the postal security device further comprising a franking means responsive to a user request for the printing of a postage indicium in a particular value in connection with a particular license number by incrementing the ascending register in the particular value, by incrementing the piece counter, and by creating a cryptographically authenticated indicium based in part on the license number and the particular value for printing on the printer; the method comprising the steps of responding to a first user request for cryptographically signing the register set and copying the cryptographically signed register set via the communications channel to external apparatus; responding to a second user request by retrieving from external apparatus the register set and cryptographically authenticating the register set, and storing the register sent within the storage area.

6. A franking system comprising a first printer and a second printer, a first postal security device having a first identifier, said first postal security device communicatively coupled with the first printer, and a first communications channel coupled with the first postal security device to apparatus external to the first printer and external to the first postal security device, the first postal security device comprising a first secure housing, the first postal security device containing within the first secure housing a first register set comprising information indicative of a first license number, a first ascending register, and a first piece counter; the system further comprising a second postal security device having a second identifier, said second postal security device communicatively coupled with the second printer, and a second communications channel coupled with the second postal security device to apparatus external to the second printer and external to the second postal security device, said second postal security device comprising a second secure housing, the second postal security device containing within the second secure housing a second register set comprising information indicative of the first license number, a second ascending register, and a second piece counter; each of the ascending registers indicative of postage printed in connection with the respective postal security device, each of the piece counters indicative of a number of mail pieces franked in connection with the respective postal security device; each postal security device further comprising a franking means responsive to a user request for the printing of a postage indicium in a particular value by incrementing the ascending register in the particular value, by incrementing the piece counter, and by creating a cryptographically authenticated indicium based in part on the respective postal security device identifier and the particular value for printing on the printer; each register set disposed to be reset by means of a cryptographically secure exchange over the communications channel, the cryptographically secure exchange including transmission of information indicative of the license number associated with the each register set.

7. The franking system of claim 6 wherein the first and second printers comprise a single printer.

* * * * *